United States Patent
Sato et al.

(10) Patent No.: US 10,961,910 B2
(45) Date of Patent: Mar. 30, 2021

(54) COMBUSTION CYLINDER, GAS TURBINE COMBUSTOR, AND GAS TURBINE

(71) Applicant: Mitsubishi Hitachi Power Systems, Ltd., Kanagawa (JP)

(72) Inventors: Kenji Sato, Kanagawa (JP); Kentaro Tokuyama, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 386 days.

(21) Appl. No.: 15/769,193

(22) PCT Filed: Oct. 28, 2016

(86) PCT No.: PCT/JP2016/082048
§ 371 (c)(1),
(2) Date: Apr. 18, 2018

(87) PCT Pub. No.: WO2017/077955
PCT Pub. Date: May 11, 2017

(65) Prior Publication Data
US 2018/0320595 A1    Nov. 8, 2018

(30) Foreign Application Priority Data
Nov. 5, 2015 (JP) .............................. JP2015-217754

(51) Int. Cl.
*F23R 3/06* (2006.01)
*F23R 3/42* (2006.01)
(Continued)

(52) U.S. Cl.
CPC ............... *F02C 7/18* (2013.01); *F01D 5/082* (2013.01); *F01D 9/023* (2013.01); *F01D 25/14* (2013.01);
(Continued)

(58) Field of Classification Search
CPC .. F01D 9/023; F23R 3/06; F23R 3/002; F23R 3/42; F23R 3/50
See application file for complete search history.

(56) References Cited

U.S. PATENT DOCUMENTS 4,050,241 A * 9/1977 DuBell ................... F23M 5/085
60/757
5,400,586 A * 3/1995 Bagepalli ................ F01D 9/023
60/800

(Continued)

FOREIGN PATENT DOCUMENTS

| EP | 3 252 287 | 12/2017 |
|----|-----------|---------|
| JP | 62-150543 | 9/1987 |

(Continued)

OTHER PUBLICATIONS

Written Opinion of the International Searching Authority dated Jan. 31, 2017 in International Application No. PCT/JP2016/082048, with English-language translation.
(Continued)

*Primary Examiner* — William H Rodriguez
*Assistant Examiner* — Henry Ng
(74) *Attorney, Agent, or Firm* — Wenderoth, Lind & Ponack, L.L.P.

(57) ABSTRACT

In a combustion cylinder, an outer-side region of a cooling part on an outer side with regard to a reference line orthogonal to a radial direction and an axial direction of a gas turbine and passing through a center of a combustor basket, and an inner-side region of the cooling part on an inner side with regard to the reference line are set. A connection angle at an intersection between an extension line of an outer surface of the combustor basket along the axial direction and an inner surface of a combustor transition piece is set. First regions are set at positions near the reference line, and second regions, with a larger connection angle than the first regions,
(Continued)

are set at positions farther from the reference line than the first regions. The second regions are set to have a higher flow rate of a cooling medium than the first regions.

20 Claims, 8 Drawing Sheets

(51) Int. Cl.
F01D 9/02 (2006.01)
F02C 7/18 (2006.01)
F01D 5/08 (2006.01)
F01D 25/14 (2006.01)
F23R 3/50 (2006.01)

(52) U.S. Cl.
CPC ............ F23R 3/06 (2013.01); F23R 3/42 (2013.01); F23R 3/50 (2013.01); F05D 2240/35 (2013.01); F23R 2900/03041 (2013.01)

(56) References Cited

U.S. PATENT DOCUMENTS

| | | | | |
|---|---|---|---|---|
| 7,032,386 | B2* | 4/2006 | Mandai | F23R 3/04 60/757 |
| 2006/0130484 | A1* | 6/2006 | Marcum | F23R 3/002 60/752 |
| 2009/0120093 | A1* | 5/2009 | Johnson | F23R 3/04 60/752 |
| 2010/0050649 | A1* | 3/2010 | Allen | F23R 3/60 60/752 |
| 2010/0071376 | A1* | 3/2010 | Wiebe | F23R 3/60 60/740 |
| 2010/0077761 | A1* | 4/2010 | Johnson | F23R 3/44 60/752 |
| 2010/0186415 | A1* | 7/2010 | Brown | F23R 3/04 60/755 |
| 2010/0229564 | A1* | 9/2010 | Chila | F23R 3/06 60/752 |
| 2011/0232299 | A1* | 9/2011 | Stryapunin | F23R 3/04 60/806 |
| 2011/0247339 | A1* | 10/2011 | Chila | F23R 3/44 60/752 |
| 2011/0252805 | A1* | 10/2011 | Berry | F23R 3/44 60/772 |
| 2012/0279226 | A1* | 11/2012 | Chen | F01D 9/023 60/772 |
| 2013/0008167 | A1* | 1/2013 | Akamatsu | F23R 3/002 60/725 |
| 2013/0167543 | A1* | 7/2013 | McMahan | F01D 9/023 60/752 |
| 2013/0180691 | A1* | 7/2013 | Jost | F02K 1/822 165/135 |
| 2014/0013762 | A1* | 1/2014 | Takiguchi | F02C 7/18 60/737 |
| 2014/0144147 | A1* | 5/2014 | Kishida | F23R 3/06 60/754 |
| 2014/0298815 | A1* | 10/2014 | Kishida | F23R 3/005 60/752 |
| 2015/0000287 | A1* | 1/2015 | Woerz | F01D 9/023 60/752 |
| 2015/0107262 | A1* | 4/2015 | Maurer | F23R 3/42 60/785 |
| 2015/0121879 | A1 | 5/2015 | Hirata et al. | |
| 2016/0047312 | A1* | 2/2016 | Hase | F02C 7/18 60/806 |
| 2016/0370009 | A1* | 12/2016 | Jin | F23R 3/002 |
| 2017/0284672 | A1 | 10/2017 | Tsunoda et al. | |
| 2017/0292389 | A1* | 10/2017 | Lorstad | F01D 25/12 |

FOREIGN PATENT DOCUMENTS

| | | |
|---|---|---|
| JP | 08-270947 | 10/1996 |
| JP | 2006-312903 | 11/2006 |
| JP | 2008-274774 | 11/2008 |
| JP | 2009-079483 | 4/2009 |
| JP | 2014-098352 | 5/2014 |
| JP | 2015-90086 | 5/2015 |
| JP | 2016-65671 | 4/2016 |
| JP | 2016-142163 | 8/2016 |
| WO | 2012/132898 | 10/2012 |

OTHER PUBLICATIONS

International Search Report dated Jan. 31, 2017 in International Application No. PCT/JP2016/0982048.

* cited by examiner

COMBUSTION CYLINDER, GAS TURBINE COMBUSTOR, AND GAS TURBINE

TECHNICAL FIELD

The present invention relates to a combustion cylinder, a gas turbine combustor where a transition piece is connected to an outer side of one end portion of a combustor basket with a gap left therebetween, and a gas turbine provided with the gas turbine combustor.

BACKGROUND ART

A typical gas turbine is configured from a compressor, a combustor, and a turbine. Air taken in through an air intake port is compressed by the compressor to obtain high-temperature and high-pressure compressed air, and fuel is supplied to the compressed air and combusted by the combustor to obtain high-temperature and high-pressure combustion gas (working fluid). The turbine is driven by the combustion gas, and a generator connected to the turbine is driven.

The combustor configured in this manner includes a combustor basket where the compressed air is introduced from the compressor and combustion gas is generated, and a transition piece that guides the generated combustion gas to the turbine. Furthermore, for the combustor basket and the transition piece, an end portion of the combustor basket on a downstream side is inserted on an inner side of an end portion of the transition piece on an upstream side, and a spring member is interposed in a compressed condition in a gap therebetween. Therefore, the combustor basket and the transition piece are connected by an elastic force of the spring member so as to prevent the former from falling.

An example of such a gas turbine combustor is disclosed in JP 2006-312903 A.

SUMMARY OF INVENTION

Technical Problem

The combustor basket and the transition piece are connected with a step in a radial direction, and therefore, when the combustion gas in the combustor basket flows into the transition piece, the gas flows to an end portion side of the transition piece positioned on an outer side from the end portion of the combustor basket, and thus the end portion of the combustor basket reaches a high temperature. Therefore, the combustor basket uses a cooling structure for cooling the end portion. A plurality of gas turbine combustors are disposed forming a ring shape between the compressor and the turbine, and an end portion of each transition piece on a compressor side forms a cylindrical shape, while a portion of an end portion thereof on a turbine side is drawn to form a rectangular shape. Therefore, a connecting shape at a position where the combustor basket and the transition piece are connected is different in a circumferential direction, and thus a portion of the end portion of the combustor basket in the circumferential direction may not be sufficiently cooled.

In order to solve the aforementioned problems, an object of the present invention is to provide a combustion cylinder, gas turbine combustor, and gas turbine that achieve long life and improve reliability by efficiently cooling the combustion cylinder.

Solution to Problems

A combustion cylinder for achieving the aforementioned object is a combustion cylinder of a gas turbine in which compressed air and fuel are mixed and combusted, of which an end portion on a downstream side in a flow direction of combustion gas is inserted and connected to a transition piece with a radial gap extending along a circumferential direction left therebetween, and which is cooled by a cooling medium in a cooling part provided at a connecting portion with the transition piece, wherein:

an outer-side region of the cooling part which is a region farther on an outer side in a radial direction of the gas turbine than a reference line with regard to the reference line, the reference line being a straight line orthogonal to the radial direction and an axial direction of the gas turbine and passing through a center of the combustion cylinder, and an inner-side region of the cooling part which is a region farther on an inner side in the radial direction of the gas turbine than the reference line with regard to the reference line are set; a connection angle at an intersection between an extension line of an outer surface of the combustion cylinder along the axial direction and an inner surface of the transition piece is set; a first region set at a position near the reference line in either the outer-side region or the inner-side region, and a second region with a larger connection angle than the first region, set at a position farther from the reference line than the first region are set; and the second region is set to have a higher flow rate of the cooling medium than the first region.

Therefore, the cooling part that cools by a cooling medium is provided at the connecting portion of the combustion cylinder and the transition piece, and thus the end portion of the combustion cylinder is kept from reaching a high temperature due to combustion gas by the cooling medium in the cooling part. At this time, in the second region with a large connection angle, the end portion of the combustion cylinder is more likely to reach a high temperature due to the combustion gas. Therefore, the cooling part is set to have a higher flow rate of the cooling medium in the second region with a large connection angle as compared to the flow rate of the cooling medium in the first region with a small connection angle. Therefore, the end portion of the combustion cylinder can be appropriately cooled by the cooling medium, regardless of the shape of the transition piece. As a result, the combustion cylinder is efficiently cooled, and therefore, reliability can be improved and long life can be achieved.

In the combustion cylinder of the present invention, the cooling part is set to have a higher flow rate of the cooling medium in the second region with a narrower radial gap than the first region, as compared to the flow rate of the cooling medium in the first region.

Therefore, the flow rate of the cooling medium is set to be high in the second region in which the radial gap is narrower than in the first region and the end portion of the combustion cylinder is more likely to reach a high temperature due to combustion gas. Thus, the end portion of the combustion cylinder can be appropriately cooled by the cooling medium, regardless of the shape of the transition piece.

Furthermore, a combustion cylinder of the present invention is a combustion cylinder of a gas turbine in which compressed air and fuel are mixed and combusted, of which an end portion on a downstream side in a flow direction of combustion gas is inserted and connected to a transition piece with a radial gap extending along a circumferential direction left therebetween, and which is cooled by a cooling medium in a cooling part provided at a connecting portion with the transition piece, wherein:

an outer-side region of the cooling part which is a region farther on an outer side in a radial direction of the gas turbine than a reference line with regard to the reference line, the reference line being a straight line orthogonal to the radial direction and an axial direction of the gas turbine and passing through a center of the combustion cylinder, and an inner-side region of the cooling part which is a region farther on an inner side in the radial direction of the gas turbine than the reference line with regard to the reference line are set;

a first region set at a position near the reference line in either the outer-side region or the inner-side region, and a second region with a narrower radial gap than the first region, set at a position farther from the reference line than the first region are set; and the second region is set to have a higher flow rate of the cooling medium than the first region.

Therefore, the cooling part that cools by a cooling medium is provided at the connecting portion of the combustion cylinder and the transition piece, and thus the end portion of the combustion cylinder is kept from reaching a high temperature due to combustion gas by the cooling medium in the cooling part. At this time, in the second region with a narrower radial gap than the first region, the end portion of the combustion cylinder is more likely to reach a high temperature due to the combustion gas. Therefore, the cooling part is set to have a higher flow rate of the cooling medium in the second region with a narrower radial gap than the first region, as compared to the flow rate of the cooling medium in the first region with a wider radial gap. Therefore, the end portion of the combustion cylinder can be appropriately cooled by the cooling medium, regardless of the shape of the transition piece. As a result, the combustion cylinder is efficiently cooled, and therefore, reliability can be improved and long life can be achieved.

In the combustion cylinder of the present invention, the connecting portion is configured by an end portion of the combustion cylinder in the axial direction and an end portion of the transition piece in the axial direction overlapping in the radial direction, and the cooling part is provided in the end portion of the combustion cylinder in the axial direction or the end portion of the transition piece in the axial direction.

Therefore, the cooling part is provided in the end portion of the combustion cylinder in the axial direction or the end portion of the transition piece in the axial direction, and thus the end portion of the combustion cylinder can be efficiently cooled by the cooling medium.

In the combustion cylinder of the present invention, the cooling part has a plurality of cooling passages provided in an end portion of the combustion cylinder on a downstream side in a flow direction of combustion gas at predetermined intervals in the circumferential direction so as to extend along the flow direction of the combustion gas, and an average interval of the plurality of cooling passages in the second region is set to be smaller than an average interval of the plurality of cooling passages in the first region.

Therefore, the cooling part is a plurality of cooling passages along the flow direction of the combustion gas, and thus the cooling part can be simplified. The average interval of the plurality of cooling passages in the second region is set to be smaller than the average interval of the plurality of cooling passages in the first region, and thus the end portion of the combustion cylinder in the second region can be efficiently cooled by a simple configuration.

In the combustion cylinder of the present invention, the plurality of cooling passages have first end portions that open to the radial gap, and second end portions that open in an end surface of the combustion cylinder on a downstream side in the flow direction of the combustion gas.

Therefore, the first end portions of the plurality of cooling passages are opened to the radial gap, and the second end portions thereof are opened in the end surface of the combustion cylinder, such that the end portion of the combustion cylinder is cooled by the cooling medium taken in from the outside, and then this cooling medium is discharged to a combustion gas passage, and thus a reduction in combustor efficiency can be suppressed.

In the combustion cylinder of the present invention, the plurality of cooling passages provided in the second region include first passages of which first end portions open to the radial gap, second passages in a higher number than the first passages, of which first end portions open in the end surface of the combustion cylinder, and a merging portion where second end portions of the first passages and second end portions of the second passages connect.

Therefore, after flowing from the plurality of first passages to the merging portion and merging there, the cooling medium flows through the second passages in a higher number and then is discharged. Thus, the cooling area in the end portion of the combustion cylinder that reaches a high temperature is increased, and the end portion of the combustion cylinder can be efficiently cooled.

In the combustion cylinder of the present invention, the transition piece has a cylindrical shape on an upstream side in the flow direction of the combustion gas, and has, on a downstream side in the flow direction of the combustion gas, a rectangular cylindrical shape with a length of a second side along the circumferential direction of the gas turbine longer than a length of a first side along the radial direction of the gas turbine, and the first region is provided on the first side and the second region is provided on the second side.

Therefore, even with a transition piece that changes from a cylindrical shape to a rectangular cylindrical shape, the end portion of the combustion cylinder connected to the transition piece can be efficiently cooled around the entire circumference.

In the combustion cylinder of the present invention, the cooling part has a plurality of cooling passages provided in an end portion of the combustion cylinder on a downstream side in a flow direction of the combustion gas at predetermined intervals in the circumferential direction so as to extend along the flow direction of the combustion gas, and a cross-sectional area of the cooling passages per unit length in the circumferential direction is set to be larger in the second region than in the first region.

Therefore, the cross-sectional area of the cooling passage in the second region is set to be larger than the cross-sectional area of the cooling passage in the first region, and thus the end portion of the combustion cylinder in the second region can be efficiently cooled by a simple configuration.

In the combustion cylinder of the present invention, the outer-side region is set in an outer-side first region constituting the first region, and in an outer-side second region constituting the second region farther on an outer side in the radial direction of the gas turbine than the outer-side first region, and the outer-side second region is set to be larger than the outer-side first region.

Therefore, the outer-side second region is set to be larger than the outer-side first region, and thus the end portion of the combustion cylinder in the outer-side second region can be efficiently cooled.

In the combustion cylinder of the present invention, the inner-side region is set in an inner-side first region constituting the first region, and in an inner-side second region constituting the second region farther on an inner side in the radial direction of the gas turbine than the inner-side first region, and the inner-side second region is set to be smaller than the inner-side first region.

Therefore, the inner-side second region is set to be smaller than the inner-side first region, and thus the end portion of the combustion cylinder in the outer-side second region can be efficiently cooled.

In the combustion cylinder of the present invention, the outer-side region is set in an outer-side first region constituting the first region, and in an outer-side second region constituting the second region farther on an outer side in the radial direction of the gas turbine than the outer-side first region, and the outer-side second region is set to be larger than the outer-side first region. The inner-side region is set in an inner-side first region constituting the first region, and in an inner-side second region constituting the second region farther on an inner side in the radial direction of the gas turbine than the inner-side first region, and the outer-side second region is set to be larger than the inner-side second region.

Therefore, the outer-side second region is set to be larger than the inner-side second region, and thus the outer-side second region which is prone to reach a high temperature can be efficiently cooled.

In the combustion cylinder of the present invention, the first region and the second region are each set to be axisymmetric with regard to a second reference line orthogonal to the reference line and the axial direction of the combustion cylinder.

Therefore, the first region and the second region are set to be axisymmetric with regard to the second reference line, and thus the combustion cylinder can be cooled with favorable balance.

In the combustion cylinder of the present invention, the cooling part has a plurality of cooling passages provided in an end portion of the combustion cylinder on a downstream side in a flow direction of the combustion gas at predetermined intervals in the circumferential direction so as to extend along the flow direction of the combustion gas, and the number of the cooling passages in the outer-side region is set to be higher than the number of the cooling passages in the inner-side region.

Therefore, the number of the cooling passages in the outer-side region is set to be higher than the number of the cooling passages in the inner-side region, and thus the end portion of the combustion cylinder in the second region can be efficiently cooled by a simple configuration.

In the combustion cylinder of the present invention, the cooling part has a plurality of cooling passages provided in an end portion of the combustion cylinder on a downstream side in a flow direction of combustion gas at predetermined intervals in the circumferential direction so as to extend along the flow direction of the combustion gas, and the number of the cooling passages in the first region is set to be lower than the number of the cooling passages in the second region.

Therefore, the number of the cooling passages in the first region is set to be lower than the number of the cooling passages in the second region, and thus the end portion of the combustion cylinder in the second region can be efficiently cooled by a simple configuration.

In the combustion cylinder of the present invention, an average interval of the plurality of cooling passages is set within from 5.5 mm to 8.5 mm in the first region, and set within from 2.0 mm to 5.0 mm in the second region.

Therefore, the average interval of the plurality of cooling passages is set to an optimal value in the first region and the second region, and thus the end portion of the combustion cylinder can be efficiently cooled.

In the combustion cylinder of the present invention, the outer-side first region and the outer-side second region are adjacent in the circumferential direction of the combustion cylinder, and a boundary position between the outer-side first region and the outer-side second region is set within a range of 15 degrees to 30 degrees from the reference line.

Therefore, the boundary position between the outer-side first region and the outer-side second region is set to an optimal position, and thus the end portion of the combustion cylinder can be efficiently cooled.

In the combustion cylinder of the present invention, the inner-side first region and the inner-side second region are adjacent in the circumferential direction of the combustion cylinder, and a boundary position between the inner-side first region and the inner-side second region is set within a range of 60 degrees to 75 degrees from the reference line.

Therefore, the boundary position between the inner-side first region and the inner-side second region is set to an optimal position, and thus the end portion of the combustion cylinder can be efficiently cooled.

In the combustion cylinder of the present invention, the connection angle at a position where the combustion cylinder and the reference line intersect is set at 0 degrees, the connection angle at a position intersecting with the second reference line in the outer-side region is set within from 12 degrees to 16 degrees, and the connection angle at a position intersecting with the second reference line in the inner-side region is set within from 8 degrees to 12 degrees.

Therefore, the connection angle at a position intersecting the second reference line in the outer-side region and the connection angle at a position intersecting the second reference line in the inner-side region are set to an optimal position, and thus the end portion of the combustion cylinder can be efficiently cooled.

Furthermore, a gas turbine combustor of the present invention includes: the above-described combustion cylinder in which compressed air and fuel are mixed and combusted; and a transition piece to which an end portion of the combustion cylinder on a downstream side in a flow direction of combustion gas is inserted and connected with a radial gap extending along a circumferential direction left therebetween.

Therefore, the combustion cylinder is efficiently cooled, and thus the reliability of the gas turbine can be improved and long life can be achieved.

A gas turbine of the present invention includes: a compressor that compresses air; a combustor that mixes and combusts fuel and compressed air compressed by the compressor; and a turbine that produces rotational power by combustion gas generated by the combustor, wherein the above-described gas turbine combustor is used as the combustor.

Therefore, the end portion of the combustion cylinder can be appropriately cooled by the cooling medium, and the combustion cylinder is efficiently cooled, regardless of the shape of the transition piece, and thus the reliability of the gas turbine can be improved and long life can be achieved.

Advantageous Effects of Invention

With the combustion cylinder, gas turbine combustor, and gas turbine of the present invention, the combustion cylinder is efficiently cooled, and thus reliability can be improved and long life can be achieved.

DESCRIPTION OF EMBODIMENTS

Preferred embodiments of a combustion cylinder, gas turbine combustor, and gas turbine according to the present invention are described in detail below while referring to the attached drawings. Note that the present invention is not limited by the embodiments, and includes configurations combining various embodiments when a plurality of embodiments are provided.

First Embodiment

Figure 6:
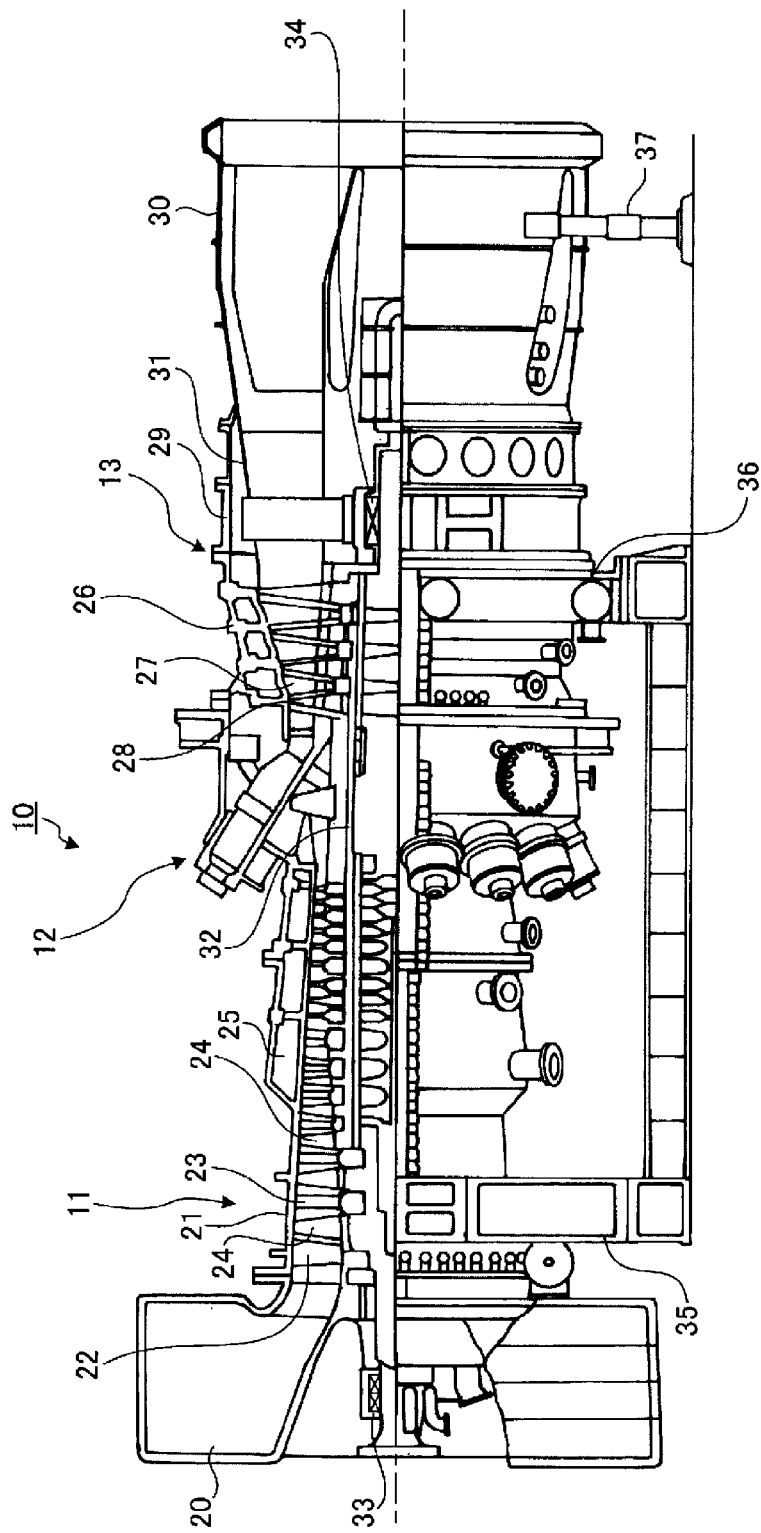
FIG. 6 is a schematic configuration diagram illustrating a gas turbine according to the first embodiment.
Figure 7:
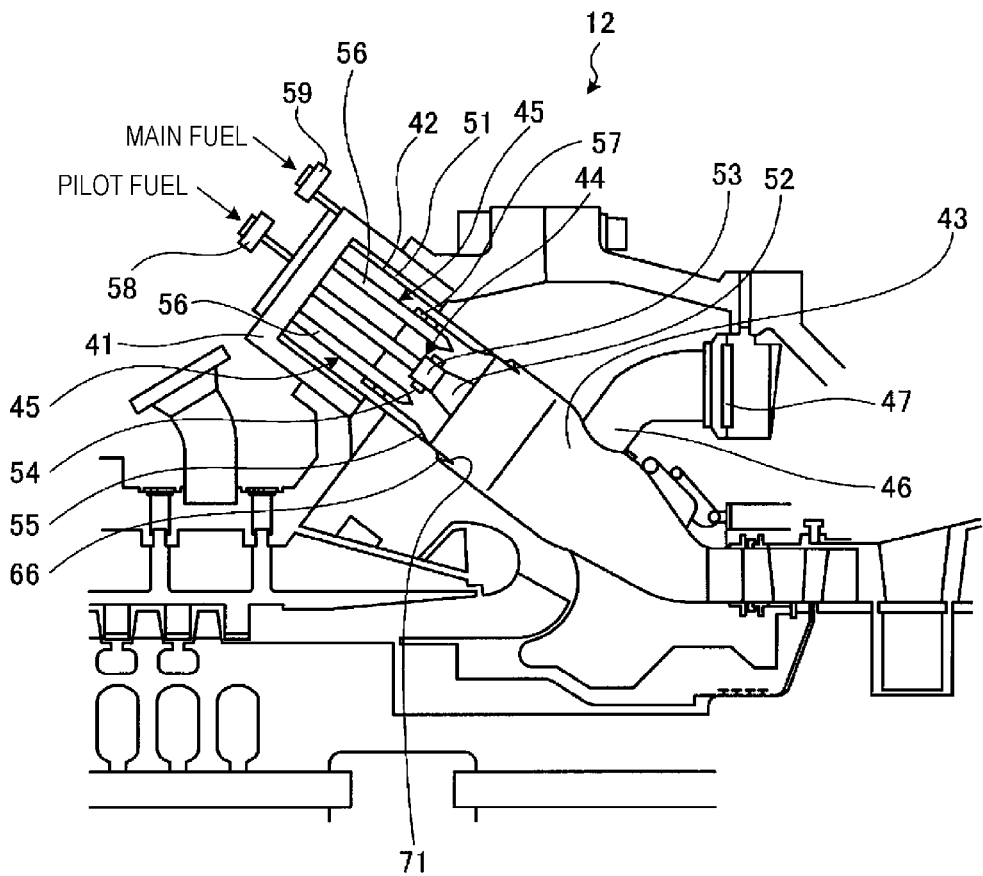
FIG. 7 is a schematic view illustrating the gas turbine combustor.
Figure 8:
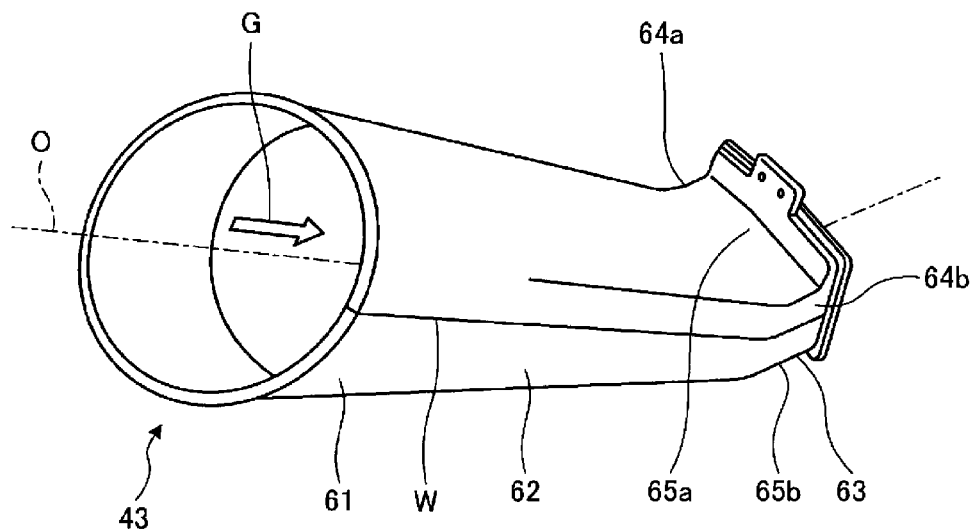
FIG. 8 is a perspective view illustrating the combustor transition piece.

FIG. 6 is a schematic configuration diagram illustrating a gas turbine according to the first embodiment, FIG. 7 is a schematic view illustrating a gas turbine combustor, and FIG. 8 is a perspective view illustrating a combustor transition piece.

As illustrated in FIG. 6, in the first embodiment, a gas turbine 10 is configured from a compressor 11, a combustor 12, and a turbine 13. The gas turbine 10 is coaxially connected to a generator not illustrated in the drawings, and can generate power.

The compressor 11 has an air intake port 20 through which air is taken in, an inlet guide vane (IGV) 22 disposed inside a compressor casing 21, a plurality of vanes 23 and blades 24 alternatingly disposed in a front-back direction (axial direction of a rotor 32 described later) in the compressor casing, and an air bleed chamber 25 disposed on an outer side thereof. The combustor 12 supplies fuel to compressed air compressed by the compressor 11, and enables combustion by igniting. The turbine 13 has a plurality of vanes 27 and blades 28 alternatingly disposed in the front-back direction (the axial direction of the rotor 32 described later) inside a turbine casing 26. An exhaust chamber 30 is disposed on a downstream side of the turbine casing 26 via an exhaust casing 29, and the exhaust chamber 30 has an exhaust diffuser 31 connected to the turbine 13.

Furthermore, the rotor (rotating shaft) 32 is positioned so as to pass through centers of the compressor 11, combustor 12, turbine 13, and exhaust chamber 30. An end portion of the rotor 32 on a compressor 11 side is rotatably supported by a bearing portion 33, and an end portion of the rotor 32 on an exhaust chamber 30 side is rotatably supported by a bearing portion 34. Furthermore, a stack of a plurality of discs on which the blades 24 are mounted is secured to the rotor 32 in the compressor 11, a stack of a plurality of discs on which the blades 28 are mounted is secured to the rotor 32 in the turbine 13, and a drive shaft of the generator not illustrated in the drawings is connected to the end portion on the exhaust chamber 30 side.

Furthermore, in the gas turbine 10, the compressor casing 21 of the compressor 11 is supported by a leg portion 35, the turbine casing 26 of the turbine 13 is supported by a leg portion 36, and the exhaust chamber 30 is supported by a leg portion 37.

Therefore, air taken in through the air intake port 20 of the compressor 11 is compressed by passing through the inlet guide vane 22 and the plurality of vanes 23 and blades 24 to obtain high-temperature and high-pressure compressed air. Predetermined fuel is supplied to the compressed air in the combustors 12 and then combusted. Furthermore, high-temperature and high-pressure combustion gas serving as a working fluid generated by the combustors 12 passes through the plurality of vanes 27 and blades 28 configuring the turbine 13 to rotationally drive the rotor 32, and thus the generator connected to the rotor 32 is driven. On the other hand, the combustion gas having driven the turbine 13 is discharged to the atmosphere as exhaust gas.

In the above-described combustor 12, a combustor basket 42 is supported at a predetermined interval inside of a combustor external cylinder 41, and a combustor transition piece 43 is connected to a tip end portion of the combustor basket 42, and thus a combustor casing is configured, as illustrated in FIG. 7. A pilot combustion burner 44 is centrally disposed inside the combustor basket 42, and a plurality of main combustion burners 45 are disposed on an inner circumferential surface of the combustor basket 42 so as to surround the pilot combustion burner 44 along a circumferential direction. Furthermore, the transition piece 43 is connected to a bypass pipe 46, and the bypass pipe 46 includes a bypass valve 47.

To go into more detail, a base end portion of the combustor basket 42 is mounted to a base end portion of the combustor external cylinder 41 to form an air flow channel 51 therebetween. Furthermore, the pilot combustion burner 44 is disposed positioned at a center inside the combustor basket 42, and the plurality of main combustion burners 45 are disposed on a periphery thereof.

The pilot combustion burner 44 is configured from a pilot cone 52 supported on the combustor basket 42, a pilot nozzle 53 disposed inside the pilot cone 52, and a swirler vane 54 provided on an outer circumferential portion of the pilot nozzle 53. Furthermore, each main combustion burner 45 is configured from a burner cylinder 55, a main nozzle 56 disposed inside the burner cylinder 55, and a swirler vane 57 provided on an outer circumferential portion of the main nozzle 56.

Furthermore, for the combustor external cylinder 41, a pilot fuel line not illustrated in the drawings is connected to a fuel port 58 of the pilot nozzle 53, and a main fuel line not illustrated in the drawings is connected to a fuel port 59 of the main nozzle 56.

Therefore, when the airflow of the high-temperature and high-pressure compressed air flows into the air flow channel 51, the compressed air flows into the combustor basket 42, and the compressed air is mixed with fuel injected from the main combustion burners 45 to form a swirling flow of a premixed gas in the combustor basket 42. Furthermore, the compressed air is mixed with fuel injected from the pilot combustion burner 44, is ignited by a pilot light not illustrated in the drawings and combusted to obtain combustion gas, and then is spouted into the combustor basket 42. At this time, a portion of the combustion gas is spouted so as to diffuse in a periphery with a flame inside the combustor basket 42, and therefore is ignited and combusted by a premixed gas flowing from the main combustion burners 45 into the combustor basket 42. In other words, flame stabilization for performing stable combustion of a lean premixed fuel from the main combustion burners 45 can be performed by the diffusion flame based on the pilot fuel injected from the pilot combustion burner 44.

As illustrated in FIG. 8, the combustor transition piece 43 is formed into a cylindrical shape by bending a flat plate and welding end portions together (welded portion W). At this time, the combustor transition piece 43 has a first end portion bent into a cylindrical shape, and a second end portion bent and drawn into a rectangular shape. Therefore, the combustor transition piece 43 is configured from a cylindrical portion 61, a shape transitioning portion 62, and a rectangular cylindrical portion 63, and the cylindrical portion 61 and the rectangular cylindrical portion 63 are smoothly connected by the shape transitioning portion 62. A plurality of the combustor transition pieces 43 are disposed in a ring shape at predetermined intervals in the circumferential direction of the gas turbine 10 (refer to FIG. 6). Therefore, the combustor transition pieces 43 are disposed in an inclined manner such that a tip end portion of an axis center O where combustion gas G flows approaches an axis center of the rotor 32 (refer to FIG. 6). Furthermore, an opening of the rectangular cylindrical portion 63 is formed by first sides 64a, 64b along the radial direction of the gas turbine 10, and second sides 65a, 65b along the circumferential direction of the gas turbine 10, and a circumferential length of the second side 65a positioned on an outer side in the radial direction of the gas turbine 10 is longer than a length of the second side 65b positioned on an inner side in the radial direction of the gas turbine 10.

Furthermore, as illustrated in FIG. 7, an end portion 71 of the combustor basket 42 on a downstream side in the flow direction of the combustion gas G is inserted in an end portion (cylindrical portion 61) of the combustor transition piece 43 on an upstream side in the flow direction of the combustion gas G, with a radial gap extending along the circumferential direction left therebetween. Furthermore, a spring clip (spring member) 66 is interposed in the circumferential direction at a position where the end portion 71 of the combustor basket 42 and the cylindrical portion 61 of the combustor transition piece 43 overlap in the radial direction, and thus the combustor basket 42 and the combustor transition piece 43 are connected.

Figure 1:
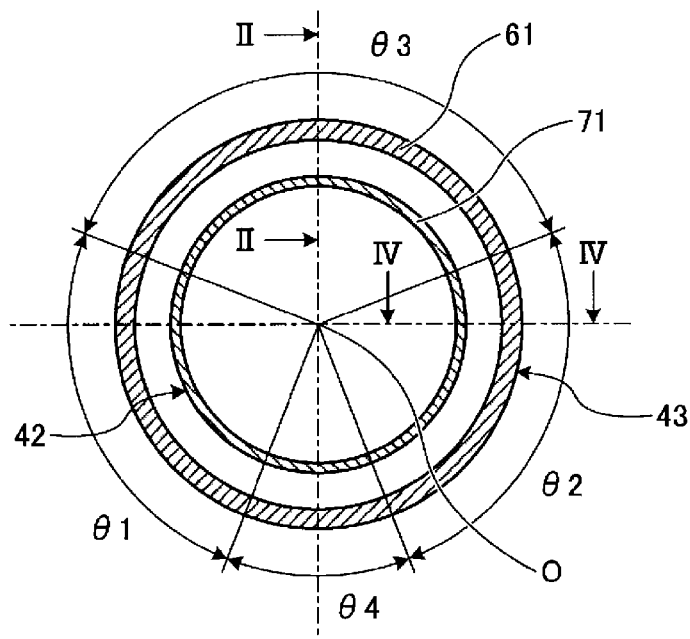
FIG. 1 is a cross-sectional view illustrating a connecting portion of a combustor basket and a combustor transition piece in a gas turbine combustor according to a first embodiment.
Figure 2:
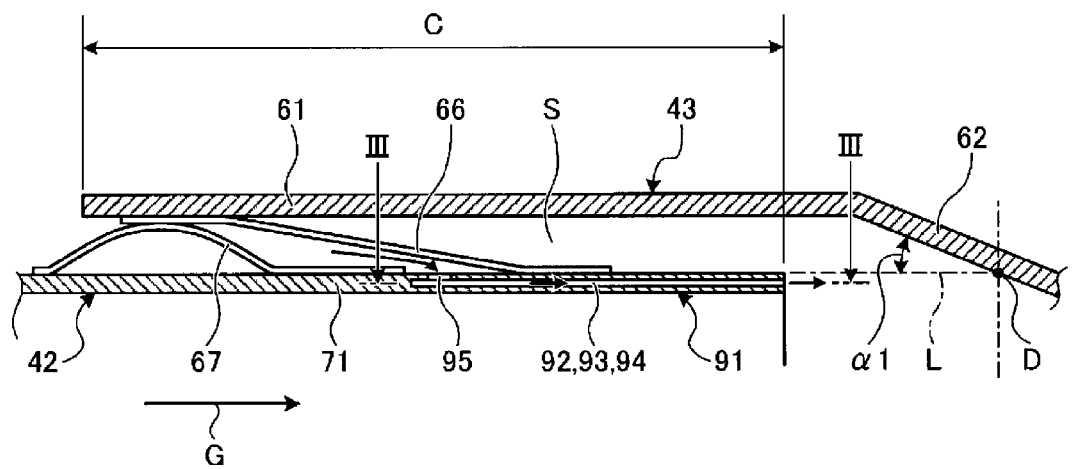
FIG. 2 is a cross-sectional view along line II-II of FIG. 1, illustrating the connecting portion of the combustor basket and the combustor transition piece.
Figure 3:
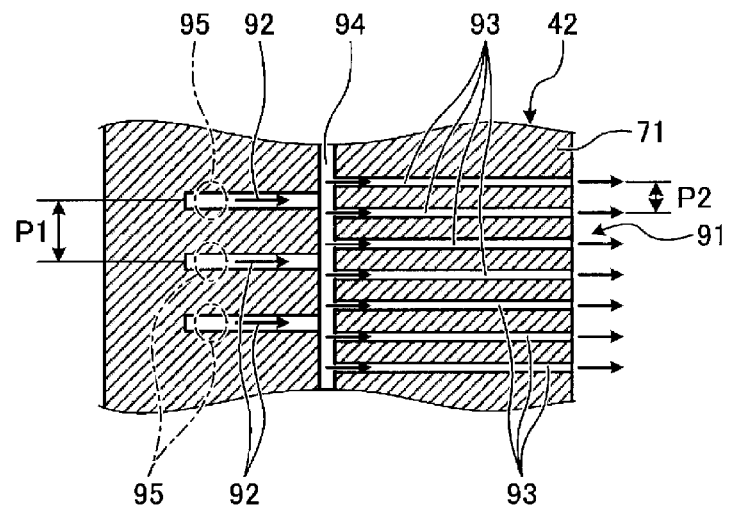
FIG. 3 is a cross-sectional view along line of FIG. 2, illustrating the connecting portion of the combustor basket and the combustor transition piece.
Figure 4:
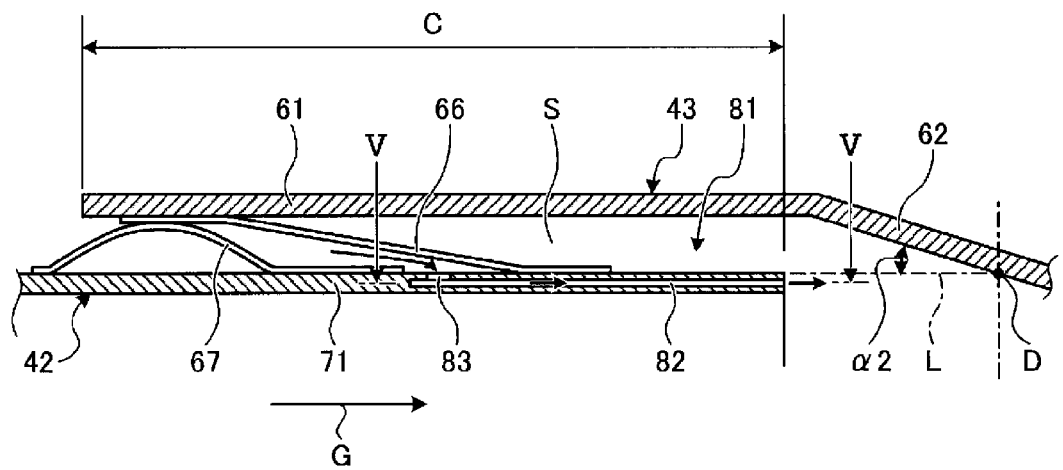
FIG. 4 is a cross-sectional view along line IV-IV of FIG. 1, illustrating the connecting portion of the combustor basket and the combustor transition piece.
Figure 5:
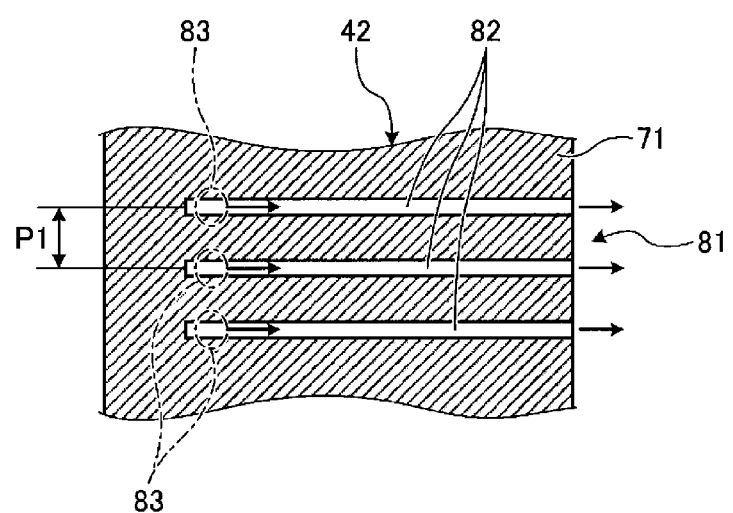
FIG. 5 is a cross-sectional view along line V-V of FIG. 4, illustrating the connecting portion of the combustor basket and the combustor transition piece.

Herein, a connecting portion of the combustor basket 42 and the combustor transition piece 43 is described in detail. FIG. 1 is a cross-sectional view illustrating the connecting portion of the combustor basket and the combustor transition piece in the gas turbine combustor according to the first embodiment; FIG. 2 is a cross-sectional view along II-II of FIG. 1, illustrating the connecting portion of the combustor basket and the combustor transition piece; FIG. 3 is a cross-sectional view along of FIG. 2, illustrating the connecting portion of the combustor basket and the combustor transition piece; FIG. 4 is a cross-sectional view along IV-IV of FIG. 1, illustrating the connecting portion of the combustor basket and the combustor transition piece; and FIG. 5 is a cross-sectional view along V-V of FIG. 4, illustrating the connecting portion of the combustor basket and the combustor transition piece.

As illustrated in FIG. 1 and FIG. 2, the combustor basket 42 forms a cylindrical shape, and an outer diameter of the end portion 71 on the downstream side in the flow direction of the combustion gas G is set to a smaller dimension than an inner diameter of the end portion of the combustor transition piece 43 on the upstream side in the flow direction of the combustion gas G, in other words, an inner diameter of the cylindrical portion 61. In this case, the end portion 71 of the combustor basket 42 is inserted in the cylindrical portion 61 of the combustor transition piece 43 with a radial gap S extending along the circumferential direction left therebetween, such that a region where the end portion 71 of the combustor basket 42 and the cylindrical portion 61 of the combustor transition piece 43 overlap in the radial direction becomes a connecting portion C. Furthermore, the spring clip 66 is disposed in the radial gap S between the end portion 71 of the combustor basket 42 and the cylindrical portion 61 of the combustor transition piece 43.

The combustor basket 42 has a plate-shaped buggy clip 67 that can elastically deform and is secured on an outer circumferential surface of the end portion 71. The buggy clip 67 forms a curved shape where a middle portion in the flow direction of the combustion gas G protrudes to an outer side, and is secured to the outer circumferential surface of the end portion 71. The spring clip 66 fulfills a role of connecting the combustor basket 42 to the combustor transition piece 43 so as to prevent the combustor basket 42 from falling. The spring clip 66 is a plate spring member that can elastically deform, and an end portion thereof on the downstream side in the flow direction of the combustion gas G is secured to an outer circumferential surface of the end portion 71 in the combustor basket 42, while an end portion thereof on the upstream side in the flow direction of the combustion gas G floats from the outer circumferential surface of the combustor basket 42 and is held between an inner surface of the cylindrical portion 61 and the buggy clip 67.

The spring clip 66 and the buggy clip 67 are disposed on an outer side of the combustor basket 42, along the entire circumference thereof. Furthermore, the spring clip 66 is pressed on the inner circumferential surface of the combustor transition piece 43 by a force with which the buggy clip 67 squeezed between the combustor basket 42 and the combustor transition piece 43 tries to return to an original shape, in a condition where the end portion 71 of the combustor basket 42 is inserted in the cylindrical portion 61 of the combustor transition piece 43. Therefore, the combustor basket 42 is prevented from falling from the combustor transition piece 43.

Furthermore, in the first embodiment, as illustrated in FIG. 1 to FIG. 5, cooling parts 81, 91 that cool using compressed air as a cooling medium are provided at the connecting portion C of the combustor basket (combustion cylinder) 42 and the combustor transition piece 43. In the present embodiment, the cooling parts 81, 91 are provided in the end portion 71 of the combustor basket 42, and are set such that the flow rate of the compressed air in the second cooling part 91 provided in second regions θ3, θ4 where the shape transitioning portion 62 of the combustor transition piece 43 approaches the end portion 71 of the combustor basket 42 is higher than the flow rate of the compressed air in the first cooling part 81 provided in first regions θ1, θ2 where the shape transitioning portion 62 of the combustor transition piece 43 is separated from the end portion 71 of the combustor basket 42.

As described above, for the combustor transition piece 43, the shape transitioning portion 62 and the rectangular cylindrical portion 63 form a drawn shape with regard to the cylindrical portion 61, and therefore, a rear end portion of the shape transitioning portion 62 of the combustor transition piece 43 is bent to a center side with regard to the end portion 71 of the combustor basket 42, a connection angle α is set, and the connection angle α varies in the circumferential direction.

Specifically, as illustrated in FIG. 2 and FIG. 4, an extension line L extending in a straight line toward the downstream side in the flow direction of the combustion gas G from an outer surface of the combustor basket 42 along the axial direction contacts an inner surface of the shape transitioning portion 62 of the combustor transition piece 43 at an intersection (connection point D). At this time, an angle formed by the extension line L and the inner surface of the shape transitioning portion 62 at the intersection (connection point D) is defined as the connection angle α. Therefore, in the present embodiment, the flow rate of compressed air in the second cooling part 91 provided in the second regions θ3, θ4 with a large connection angle α is set to be higher than the flow rate of compressed air in the first cooling part 81 provided in the first regions θ1, θ2 with a small connection angle α.

Herein, the distance from a rear end of the combustor basket 42 to the connection point D is constant in the circumferential direction, and a position of a connecting bent portion between the cylindrical portion 61 and the shape transitioning portion 62 varies in the circumferential direction. However, the position of the connecting bent portion may be constant in the circumferential direction, and the distance from the rear end of the combustor basket 42 to the connection point D may vary in the circumferential direction. Furthermore, in a case where the outer surface of the combustor basket 42 is curved, a tangent at the position of the rear end is the extension line L, and in a case where the inner surface of the combustor transition piece 43 is curved, an angle formed by the extension line L and a tangent of the inner surface at the connection point D on the inner surface of the combustor transition piece 43 is the connection angle α. Furthermore, when the shape transitioning portion 62 is not inclined, and the extension line L does not intersect with the inner surface of the shape transitioning portion 62, the connection angle α=0.

As illustrated in FIG. 1 and FIG. 4, an inclination angle of a wall surface of the shape transitioning portion 62 is small, and therefore a connection angle α2 is small in the first regions θ1, θ2 on both sides in the circumferential direction of the gas turbine 10. On the other hand, as illustrated in FIG. 1 and FIG. 2, an inclination angle of a wall surface of the shape transitioning portion 62 is large, and therefore a connection angle α1 is large in the second regions θ3, θ4 on the inner side and outer side in the radial direction of the gas turbine 10. Therefore, in the second regions θ3, θ4, the combustion gas G flowing through the combustor basket 42 flows from the end portion 71 to an inner side of the shape transitioning portion 62, the end portion 71 of the combustor basket 42 reaches a high temperature, and thus reduction in thickness due to high-temperature oxidation may occur. Therefore, the second regions θ3, θ4 with the large connection angle α1 needs to be efficiently cooled as compared to the first regions θ1, θ2 with the small connection angle α2.

In this case, the first cooling part 81 is provided in the first regions θ1, θ2 with the small connection angle α2, and the second cooling part 91 is provided in the second regions θ3, θ4 with the large connection angle α1. Furthermore, the first regions θ1, θ2 are provided on the first sides 64a, 64b (refer to FIG. 8), and the second regions θ3, θ4 are provided on the second sides 65a, 65b (refer to FIG. 8). In this case, the second side 65a is longer than the second side 65b, and therefore, a length in the circumferential direction of the second region θ3 is set to be longer than a length in the circumferential direction of the second region θ4. Note that the lengths of the first sides 64a, 64b are the same, and therefore, the lengths in the circumferential direction of the first regions θ1, θ2 are set to be the same. Note that the welded portion W (refer to FIG. 8) in the combustor transition piece 43 is disposed in the first region θ2.

As illustrated in FIG. 1, FIG. 4, and FIG. 5, the first cooling part 81 is provided in the end portion 71 in the axial direction of the combustor basket 42, in the first regions θ1, θ2 (first sides 64a, 64b side). The first cooling part 81 is a plurality of cooling passages provided in the end portion 71 of the combustor basket 42 on the downstream side in the flow direction of the combustion gas G, so as to extend along the flow direction of the combustion gas G and penetrate the end portion 71 at predetermined intervals in the circumferential direction of the combustor basket 42. Specifically, the first cooling part 81 is configured from a plurality of first cooling passages 82 formed along the axial direction of the combustor basket 42 at predetermined intervals in the circumferential direction, and a plurality of first cooling holes 83 formed along the radial direction of the combustor basket 42 at predetermined intervals in the circumferential direction. The first cooling passages 82 have first end portions that connect to the first cooling holes 83 and second end portions that open in an end surface of the combustor basket 42. The first cooling holes 83 open to the radial gap S.

As illustrated in FIG. 1 to FIG. 3, the second cooling part 91 is provided in the end portion 71 in the axial direction of the combustor basket 42, in the second regions θ3, θ4 (second sides 65a, 65b side). The second cooling part 91 is a plurality of cooling passages provided in the end portion 71 of the combustor basket 42 on the downstream side in the flow direction of the combustion gas G, so as to extend along the flow direction of the combustion gas G and penetrate the end portion 71 at predetermined intervals in the circumferential direction of the combustor basket 42. Specifically, the second cooling part 91 is configured from a plurality of first passages 92 and second passages 93 formed along the axial direction of the combustor basket 42 at predetermined intervals in the circumferential direction, a merging portion 94 where the first passages 92 and the second passages 93 are connected along the circumferential direction of the combustor basket 42, and a plurality of second cooling holes 95 formed along the radial direction of the combustor basket 42 at predetermined intervals in the circumferential direction. Herein, the second cooling passages are formed by the first passages 92, second passages 93, and merging portion 94. The first passages 92 have first end portions that connect to the second cooling holes 95, and second end portions that connect to the merging portion 94. The second passages 93 have first end portions that connect to the merging portion 94, and second end portions that open in an end surface of the combustor basket 42. The second cooling holes 95 open to the radial gap S.

Furthermore, as illustrated in FIG. 5, the plurality of first cooling passages 82 in the first cooling part 81 are disposed with a predetermined pitch (interval) P1 in the circumferential direction. On the other hand, as illustrated in FIG. 3, the plurality of first passages 92 in the second cooling part 91 are disposed with the predetermined pitch (interval) P1 in the circumferential direction, and the plurality of second passages 93 are disposed with a predetermined pitch (interval) P2 in the circumferential direction. Herein, the pitch P1 of the first cooling passages 82 in the first cooling part 81 and the pitch P1 of the first passages 92 in the second cooling part 91 are set at the same pitch. On the other hand, the pitch (interval) P2 of the second passages 93 in the second cooling part 91 is set to be smaller than the pitches P1 of the first cooling passages 82 and the first passages 92 (P1>P2), and thus the number of the second passages 93 is higher. Note that inner diameters of the first cooling passages 82, first passages 92, and second passages 93 are the same diameter.

Therefore, the first cooling part 81 and the second cooling part 91 are provided penetrating a plate thickness of the combustor basket 42, and therefore, a total passage area of compressed air in the second cooling part 91 (second passages 93) provided in the second regions $\theta 3$, $\theta 4$ with the large connection angle $\alpha 1$ is larger than a total passage area of compressed air in the first cooling part 81 (first cooling passages 82) provided in the first regions $\theta 1$, $\theta 2$ with the small connection angle $\alpha 2$. As a result, the flow rate of compressed air in the second cooling part 91 provided in the second regions $\theta 3$, $\theta 4$ with the large connection angle $\alpha 1$ is higher than the flow rate of compressed air in the first cooling part 81 provided in the first regions $\theta 1$, $\theta 2$ with the small connection angle $\alpha 2$.

Therefore, as illustrated in FIG. 2 and FIG. 4, a portion of compressed air compressed by the compressor 11 is introduced into the radial gap S through a gap in the spring clip 66. In the first cooling part 81, the compressed air in the radial gap S is introduced into the first cooling passages 82 from the first cooling holes 83 and flows through the first cooling passages 82 to cool the first regions $\theta 1$, $\theta 2$ in the end portion 71 of the combustor basket 42. Furthermore, in the second cooling part 91, the compressed air in the radial gap S is introduced into the first passages 92 from the second cooling holes 95 and merges at the merging portion 94. Furthermore, the compressed air is introduced into the second passages 93 from the merging portion 94 and flows through the second passages 93 to cool the second regions $\theta 3$, $\theta 4$ in the end portion 71 of the combustor basket 42.

Herein, the combustor transition piece 43 has the small connection angle $\alpha 2$ in the first regions $\theta 1$, $\theta 2$ and the large connection angle $\alpha 1$ in the second regions $\theta 3$, $\theta 4$, and therefore, in the second regions $\theta 3$, $\theta 4$, the combustion gas G flowing through the combustor basket 42 flows from the end portion 71 to the inner side of the shape transitioning portion 62, and thus the end portion 71 of the combustor basket 42 easily reaches a high temperature. However, for the second cooling part 91, a large amount of compressed air flows in the second passages 93 as compared to the first cooling part 81, and therefore, the second regions $\theta 3$, $\theta 4$ in the end portion 71 of the combustor basket 42 which is prone to reach a high temperature can be efficiently cooled.

Thus, the gas turbine combustor of the first embodiment is provided with the combustor basket 42 in which compressed air and fuel are mixed and combusted, the combustor transition piece 43 to which the end portion 71 of the combustor basket 42 on the downstream side in the flow direction of the combustion gas G is inserted and connected with the radial gap S extending along the circumferential direction left therebetween, and the cooling parts 81, 91 that cool using compressed air (cooling medium), provided at the connecting portion C of the combustor basket 42 and the combustor transition piece 43. The flow rate of compressed air in the second cooling part 91 that cools the second regions $\theta 3$, $\theta 4$ with the large connection angle $\alpha 1$ is set to be higher than the flow rate of compressed air in the first cooling part 81 that cools the first regions $\theta 1$, $\theta 2$ with the small connection angle $\alpha 2$.

Therefore, the cooling parts 81, 91 that cool using compressed air are provided at the connecting portion C of the combustor basket 42 and the combustor transition piece 43, and the end portion 71 of the combustor basket 42 is kept from reaching a high temperature due to combustion gas by the compressed air in the cooling parts 81, 91. At this time, in the second regions $\theta 3$, $\theta 4$ with the large connection angle $\alpha 1$, the end portion 71 of the combustor basket 42 is more likely to reach a high temperature due to the combustion gas. Therefore, the flow rate of the compressed air in the second cooling part 91 is higher than the flow rate of the compressed air in the first cooling part 81, and thus the end portion 71 of the combustor basket 42 can be appropriately cooled by the compressed air, regardless of the shape of the combustor transition piece 43 in the circumferential direction. As a result, the combustor basket 42 is efficiently cooled, and therefore, reliability can be improved, repair costs can be reduced, and long life can be achieved.

In the gas turbine combustor of the first embodiment, the connecting portion C is configured by the end portion 71 of the combustor basket 42 and the cylindrical portion 61 of the combustor transition piece 43 overlapping in the radial direction, and the cooling parts 81, 91 are provided in the end portion 71 in the axial direction of the combustor basket 42. The end portion 71 of the combustor basket 42 can be efficiently cooled by the compressed air.

In the gas turbine combustor of the first embodiment, the plurality of first cooling passages 82 provided at predetermined intervals in the circumferential direction are provided as the first cooling part 81, the plurality of the first passages 92 provided at predetermined intervals in the circumferential direction are provided as the second cooling part 91, and the pitch P2 of the plurality of second passages 93 is set to be smaller than the pitch P1 of the plurality of first cooling passages 82. Therefore, the cooling parts 81, 91 are provided as the plurality of passages 82, 92, 93 along the flow direction of the combustion gas, and thus the cooling parts 81, 91 can be simplified. The pitch P2 of the second passages 93 is set to be smaller than the pitch P1 of the first cooling passages 82, and thus the end portion 71 of the combustor basket 42 in the second regions θ3, θ4 with the large connection angle α1 can be efficiently cooled by a simple configuration.

In the gas turbine combustor of the first embodiment, the first end portions of the passages 82, 92, 93 of the cooling parts 81, 91 open to the radial gap S, and the second end portions thereof open in the end surface of the combustor basket 42 on the downstream side in the flow direction of the combustion gas. Therefore, the end portion 71 of the combustor basket 42 is cooled by compressed air taken in from the outside, and then this compressed air is discharged to a combustion gas passage, and thus reduction in combustor efficiency can be suppressed.

In the gas turbine combustor of the first embodiment, the second cooling holes 95 with the first end portions opening to the radial gap S, the first passages 92 with the first end portions connecting to the second cooling holes 95, the second passages 93 in a higher number than the first passages 92, with the first end portions opening in the end surface of the combustor basket 42, and the merging portion 94 where the second end portions of the first passages 92 and the second end portions of the second passages 93 connect are provided as the second cooling part 91. Therefore, after flowing from the plurality of second cooling holes 95 through the first passages 92 to the merging portion 94 and merging there, the compressed air flows through the second passages 93 in a higher number and then is discharged, and thus the cooling area in the end portion 71 of the combustor basket 42 that reaches a high temperature is increased, and the end portion 71 of the combustor basket 42 can be efficiently cooled.

In the gas turbine combustor of the first embodiment, the combustor transition piece 43 is configured from the cylindrical portion 61, the shape transitioning portion 62, and the rectangular cylindrical portion 63, and the first regions θ1, θ2 are provided on the first sides 64a, 64b along the radial direction, and the second regions θ3, θ4 are provided on the second sides 65a, 65b along the circumferential direction. Therefore, even with the combustor transition piece 43 that changes from a cylindrical shape to a rectangular cylindrical shape, the end portion 71 of the combustor basket 42 connected to the combustor transition piece 43 can be efficiently cooled around the entire circumference.

In the gas turbine combustor of the first embodiment, the length in the circumferential direction of the second region θ3 positioned on the outer side in the radial direction of the gas turbine 10 is set to be longer than the length in the circumferential direction of the second region θ4 positioned on the inner side in the radial direction of the gas turbine 10. Therefore, the lengths in the circumferential direction of the second regions θ3, θ4 are set based on the shape of the combustor transition piece 43, and thus the end portion 71 of the combustor basket 42 can be efficiently cooled around the entire circumference.

Furthermore, the gas turbine of the first embodiment is provided with the compressor 11 that compresses air, the combustor 12 that mixes and combusts fuel and the compressed air compressed by the compressor 11, and the turbine 13 that produces rotational power by combustion gas generated by the combustor 12, and the cooling parts 81, 91 that cool using the compressed air (cooling medium) are provided at the connecting portion C of the combustor basket 42 and the combustor transition piece 43 in the combustor 12. Therefore, the combustor basket 42 is efficiently cooled, and thus reliability can be improved and long life can be achieved.

Second Embodiment

Figure 9:
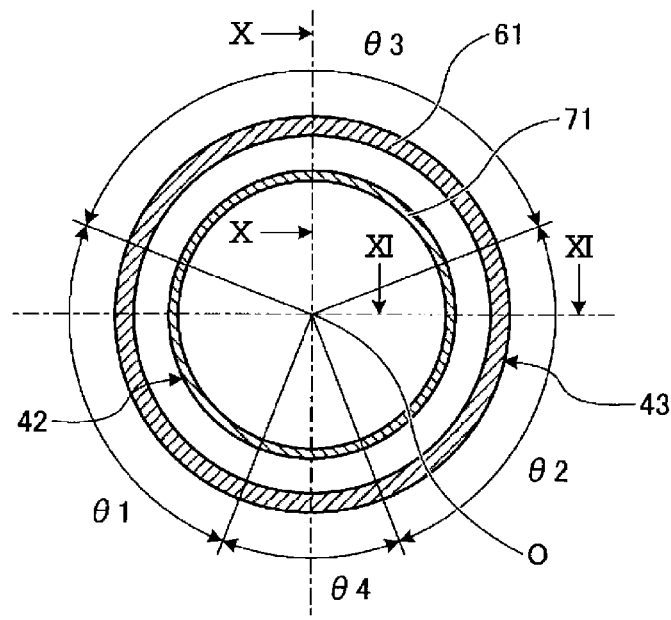
FIG. 9 is a cross-sectional view illustrating a connecting portion of a combustor basket and a combustor transition piece in a gas turbine combustor according to a second embodiment.
Figure 10:
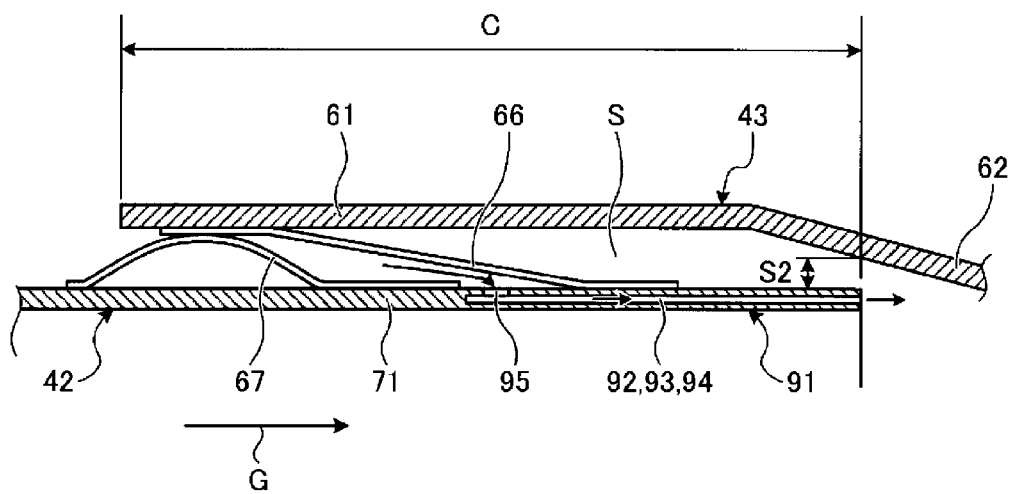
FIG. 10 is a cross-sectional view along line X-X of FIG. 9, illustrating the connecting portion of the combustor basket and the combustor transition piece.
Figure 11:
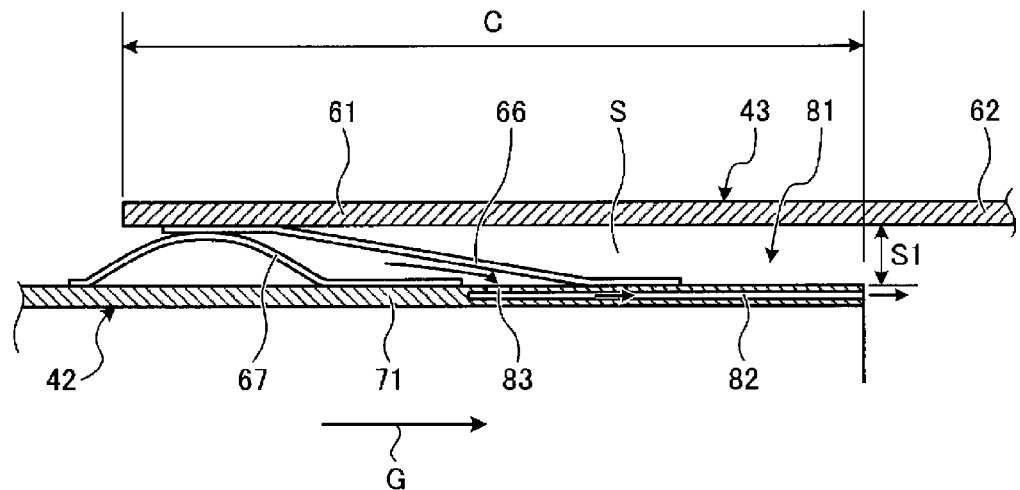
FIG. 11 is a cross-sectional view along line XI-XI of FIG. 9, illustrating the connecting portion of the combustor basket and the combustor transition piece.

FIG. 9 is a cross-sectional view illustrating a connecting portion of a combustor basket and a combustor transition piece in a gas turbine combustor according to the second embodiment; FIG. 10 is a cross-sectional view along X-X of FIG. 9, illustrating the connecting portion of the combustor basket and the combustor transition piece; and FIG. 11 is a cross-sectional view along XI-XI of FIG. 9, illustrating the connecting portion of the combustor basket and the combustor transition piece. Note that the same reference numerals are applied to members having the same functions as in the first embodiment, and detailed descriptions thereof will be omitted.

In the second embodiment, as illustrated in FIG. 9 to FIG. 11, the cooling parts 81, 91 that cool using compressed air as a cooling medium is provided at the connecting portion C of the combustor basket 42 and the combustor transition piece 43. In the present embodiment, the cooling parts 81, 91 are provided in the end portion 71 of the combustor basket 42, and are set such that the flow rate of the compressed air in the second cooling part 91 provided in the second regions θ3, θ4 with a radial gap S2 narrower than a radial gap S1 in the first regions θ1, θ2 is higher than the flow rate of the compressed air in the first cooling part 81 provided in the first regions θ1, θ2 with the wide radial gap S1.

In the combustor transition piece 43, the shape transitioning portion 62 and the rectangular cylindrical portion 63 form a drawn shape with regard to the cylindrical portion 61 as described above, and therefore, the radial gaps S1, S2 between the end portion 71 of the combustor basket 42 and the shape transitioning portion 62 of the combustor transition piece 43 vary in the circumferential direction. Specifically, in the first regions θ1, θ2 on both sides in the circumferential direction of the gas turbine 10, a wall surface of the shape transitioning portion 62 forms a straight line, and therefore, the radial gap S1 between the combustor basket 42 and the combustor transition piece 43 is wider than the radial gap S2 in the second regions θ3, θ4. On the other hand, in the second regions θ3, θ4 on the outer side and inner side in the radial direction of the gas turbine 10, a wall surface of the shape transitioning portion 62 is inclined to a center portion side, and therefore, the radial gap S2 between the combustor basket 42 and the combustor transition piece 43 is narrower than the radial gap S1 in the first regions θ1, θ2. Therefore, in the second regions θ3, θ4, the combustion gas G flowing through the combustor basket 42 flows from the end portion 71 to an inner side of the shape transitioning portion 62, and the end portion 71 of the combustor basket 42 reaches a high temperature, and thus, reduction in thickness due to high-temperature oxidation may occur. Therefore, the second regions θ3, θ4 with the radial gap S2 narrower than the radial gap S1 in the first regions θ1, θ2 need to be more efficiently cooled as compared to the first regions θ1, θ2 with the wide radial gap S1.

In this case, the first cooling part 81 is provided in the first regions θ1, θ2 with the wide radial gap S1, and the second cooling part 91 is provided in the second regions θ3, θ4 with the radial gap S2 narrower than the radial gap S1 in the first regions θ1, θ2. Furthermore, the first regions θ1, θ2 are provided on the first sides 64a, 64b (refer to FIG. 8), and the second regions θ3, θ4 are provided on the second sides 65a, 65b (refer to FIG. 8). In this case, the second side 65a is longer than the second side 65b, and therefore, the length in the circumferential direction of the second region θ3 is set to be longer than the length in the circumferential direction of the second region θ4. Note that the lengths of the first sides 64a, 64b are the same, and therefore, the lengths in the circumferential direction of the first regions θ1, θ2 are set to be the same. Note that the welded portion W (refer to FIG. 8) in the combustor transition piece 43 is disposed in the first region θ2.

Note that the first cooling part 81 and the second cooling part 91 are the same as in the first embodiment, and therefore, a description thereof is omitted.

Therefore, the first cooling part 81 and the second cooling part 91 are provided penetrating a plate thickness of the combustor basket 42, and therefore, a total passage area of compressed air in the second cooling part 91 (second passages 93) provided in the second regions θ3, θ4 with the radial gap S2 narrower than the radial gap S1 in the first regions θ1, θ2 is larger than a total passage area of compressed air in the first cooling part 81 (first cooling passages 82) provided in the first regions θ1, θ2 with the wide radial gap S1. As a result, the flow rate of the compressed air in the second cooling part 91 provided in the second regions θ3, θ4 with the radial gap S2 narrower than the radial gap S1 in the first regions θ1, θ2 is higher than the flow rate of the compressed air in the first cooling part 81 provided in the first regions θ1, θ2 with the wide radial gap S1.

Therefore, a portion of compressed air compressed by the compressor 11 is introduced into the radial gap S through a gap in the spring clip 66. In the first cooling part 81, the compressed air in the radial gap S is introduced into the first cooling passages 82 from the first cooling holes 83 and flows through the first cooling passages 82 to cool the first regions θ1, θ2 in the end portion 71 of the combustor basket 42. Furthermore, in the second cooling part 91, the compressed air in the radial gap S is introduced into the first passages 92 from the second cooling holes 95 and merges at the merging portion 94. Furthermore, the compressed air is introduced into the second passages 93 from the merging portion 94 and flows through the second passages 93 to cool the second regions θ3, θ4 in the end portion 71 of the combustor basket 42.

Herein, the combustor transition piece 43 has the wide radial gap S1 in the first regions θ1, θ2 and the narrow radial gap S2 in the second region θ3, θ4, and therefore, the combustion gas G flowing through the combustor basket 42 flows from the end portion 71 to an inner side of the shape transitioning portion 62, and the end portion 71 of the combustor basket 42 is prone to reach a high temperature, in the second regions θ3, θ4. However, for the second cooling part 91, a large amount of compressed air flows in the second passages 93 as compared to the first cooling part 81, and therefore, the second regions θ3, θ4 in the end portion 71 of the combustor basket 42 which is prone to reach a high temperature can be efficiently cooled.

Thus, the gas turbine combustor of the second embodiment is provided with the combustor basket 42 in which compressed air and fuel are mixed and combusted, the combustor transition piece 43 to which the end portion of the combustor basket 42 on the downstream side in the flow direction of the combustion gas is inserted and connected with the radial gap S left therebetween, and the cooling parts 81, 91 that cool using compressed air (cooling medium), provided at the connecting portion C of the combustor basket 42 and the combustor transition piece 43. The flow rate of compressed air in the second cooling part 91 that cools the second regions θ3, θ4 with the narrow radial gap S2 is set to be higher than the flow rate of compressed air in the first cooling part 81 that cools the first regions θ1, θ2 with the wide radial gap S1.

Therefore, the cooling parts 81, 91 that cool using compressed air are provided at the connecting portion C of the combustor basket 42 and the combustor transition piece 43, and the end portion 71 of the combustor basket 42 is kept from reaching a high temperature due to combustion gas by the compressed air in the cooling parts 81, 91. At this time, in the second regions θ3, θ4 with the narrow radial gap S2, the end portion 71 of the combustor basket 42 is more likely to reach a high temperature due to the combustion gas. Therefore, the flow rate of the compressed air in the second cooling part 91 is higher than the flow rate of the compressed air in the first cooling part 81, and thus the end portion 71 of the combustor basket 42 can be appropriately cooled by the compressed air, regardless of the shape of the combustor transition piece 43 in the circumferential direction. As a result, the combustor basket 42 is efficiently cooled, and therefore, reliability can be improved, repair costs can be reduced, and long life can be achieved.

Note that in the first embodiment, the flow rate of the compressed air to the second regions θ3, θ4 with the large connection angle α1 is set to be higher than the flow rate of the compressed air to the first regions θ1, θ2 with the small connection angle α2, and in the second embodiment, the flow rate of the compressed air to the second regions θ3, θ4 with the narrow radial gap S2 is set to be higher than the flow rate of the compressed air to the first regions θ1, θ2 with the wide radial gap S1. Herein, by adding the second embodiment to the first embodiment, the flow rate of the compressed air to the second regions θ3, θ4 with the large connection angle α1 and the narrow radial gap S2 may be set to be higher than the flow rate of the compressed air to the first regions θ1, θ2 with the small connection angle α2 and the wide radial gap S1.

Third Embodiment

Figure 12:
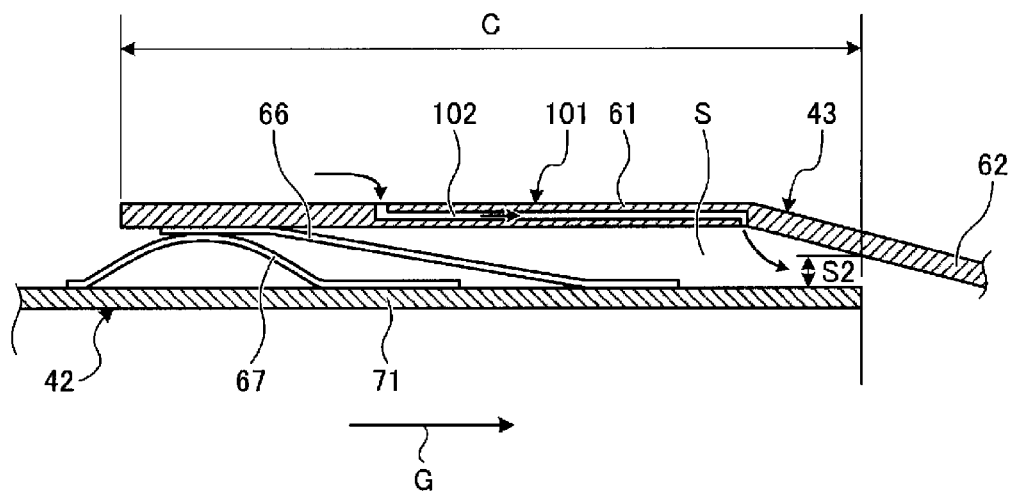
FIG. 12 is a cross-sectional view illustrating a connecting portion of a combustor basket and a combustor transition piece in a gas turbine combustor according to a third embodiment.

FIG. 12 is a cross-sectional view illustrating a connecting portion of a combustor basket and a combustor transition piece in a gas turbine combustor according to a third embodiment. Note that the same reference numerals are applied to members having the same functions as in the above-described embodiments, and detailed descriptions thereof will be omitted.

In the third embodiment, as illustrated in FIG. 12, the combustor basket 42 has the end portion 71 inserted into the cylindrical portion 61 of the combustor transition piece 43 with the radial gap S left therebetween, such that a region where the end portion 71 of the combustor basket 42 and the cylindrical portion 61 of the combustor transition piece 43 overlap in the radial direction becomes the connecting portion C. Furthermore, the spring clip 66 is disposed in the radial gap S between the end portion 71 of the combustor basket 42 and the cylindrical portion 61 of the combustor transition piece 43.

Furthermore, in the third embodiment, a cooling part 101 that cools using compressed air (cooling medium) is provided at the connecting portion C of the combustor basket 42 and the combustor transition piece 43. In the present embodiment, the cooling part 101 is provided in the cylindrical portion 61 of the combustor transition piece 43, and is set such that the flow rate of the compressed air in a second cooling part provided in the second regions θ3, θ4 (refer to FIG. 1) with the narrow radial gap S2 is higher than the flow rate of the compressed air in a first cooling part provided in the first regions θ1, θ2 (refer to FIG. 1) with the wide radial gap S1. Specifically, the cooling part 101 is a plurality of cooling passages 102 provided in the end portion (cylindrical portion 61) of the combustor transition piece 43 on the upstream side in the flow direction of the combustion gas G, so as to extend along the flow direction of the combustion gas G and penetrate the end portion at predetermined intervals in the circumferential direction of the combustor transition piece 43. The cooling passages 102 have first end portions that open in an outer surface of the combustor transition piece 43, and second end portions that open in an inner surface of the combustor transition piece 43, facing an end portion of the combustor basket 42.

In the third embodiment, although not illustrated in the drawings, the number of the cooling passages 102 provided in the second regions θ3, θ4 (refer to FIG. 1) with the narrow radial gap S2 is set to be higher than the number of the cooling passages 102 provided in the first regions θ1, θ2 (refer to FIG. 1) with the wide radial gap S1, similarly to the first embodiment.

Therefore, a portion of the compressed air compressed by the compressor 11 is introduced into the radial gap S from the plurality of cooling passages 102, and contacts the end portion 71 of the combustor basket 42 to cool the end portion 71 of the combustor basket 42. Herein, the number of the cooling passages 102 is high in the second regions θ3, θ4 with the narrow radial gap S2, and therefore, the second regions θ3, θ4 in the end portion 71 of the combustor basket 42 which is prone to reach a high temperature can be efficiently cooled.

Figure 13:
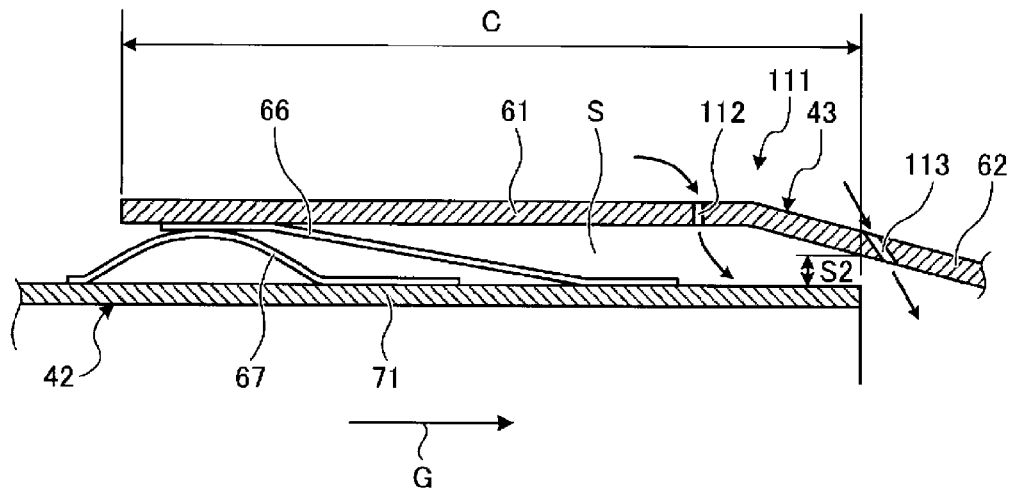
FIG. 13 is a cross-sectional view illustrating a modified example of the connecting portion of the combustor basket and the combustor transition piece in the gas turbine combustor according to the third embodiment.

Note that herein, the cooling part 101 is the plurality of cooling passages 102 provided in the cylindrical portion 61 of the combustor transition piece 43, but the configuration is not restricted thereto. FIG. 13 is a cross-sectional view illustrating a modified example of the connecting portion of the combustor basket and the combustor transition piece in the gas turbine combustor according to the third embodiment.

In the modified example of the third embodiment, as illustrated in FIG. 13, a cooling part 111 that cools using compressed air (cooling medium) is provided at the connecting portion C of the combustor basket 42 and the combustor transition piece 43. In the present embodiment, the cooling part 111 is provided in the shape transitioning portion 62 and the cylindrical portion 61 of the combustor transition piece 43, and is set such that the flow rate of the compressed air in a second cooling part provided in the second regions θ3, θ4 (refer to FIG. 1) with the radial gap S2 narrower than the radial gap S1 in the first regions θ1, θ2 (refer to FIG. 1) is higher than the flow rate of the compressed air in a first cooling part provided in the first regions θ1, θ2 with the wide radial gap S1. Specifically, the cooling part 111 is a plurality of cooling passages 112, 113 provided in the cylindrical portion 61 and the shape transitioning portion 62 of the combustor transition piece 43 on the upstream side in the flow direction of the combustion gas G, so as to extend along the radial direction of the combustor transition piece 43 and penetrate these portions at predetermined intervals in the circumferential direction of the combustor transition piece 43. The cooling passages 112, 113 are disposed in the flow direction of the combustion gas G so as to be staggered, and have first end portions that open in an outer surface of the combustor transition piece 43, and second end portions that open in an inner surface of the combustor transition piece 43, facing the end portion 71 of the combustor basket 42.

In the modified example of the third embodiment, although not illustrated in the drawings, the number of the cooling passages 112, 113 provided in the second regions θ3, θ4 (refer to FIG. 1) with the radial gap S2 narrower than the radial gap S1 in the first regions θ1, θ2 (refer to FIG. 1) is set to be higher than the number of the cooling passages 112, 113 provided in the first regions θ1, θ2 with the wide radial gap S, similarly to the third embodiment. Note that the effect is similar to that in the third embodiment, and therefore, a description thereof is omitted.

Thus, the gas turbine combustor of the third embodiment is provided with the cooling parts 101, 111 that cool using compressed air (cooling medium) at the connecting portion C of the combustor basket 42 and the combustor transition piece 43, and the flow rate of the compressed air in the second cooling part that cools the second regions θ3, θ4 with the radial gap S2 narrower than the radial gap S1 in the first regions θ1, θ2 is set to be higher than the flow rate of the compressed air in the first cooling part that cools the first regions θ1, θ2 with the wide radial gap S1.

Therefore, the end portion 71 of the combustor basket 42 can be appropriately cooled by the compressed air, regardless of the shape of the combustor transition piece 43 in the circumferential direction. As a result, the combustor basket 42 is efficiently cooled, and therefore, reliability can be improved and long life can be achieved.

Fourth Embodiment

Figure 14:
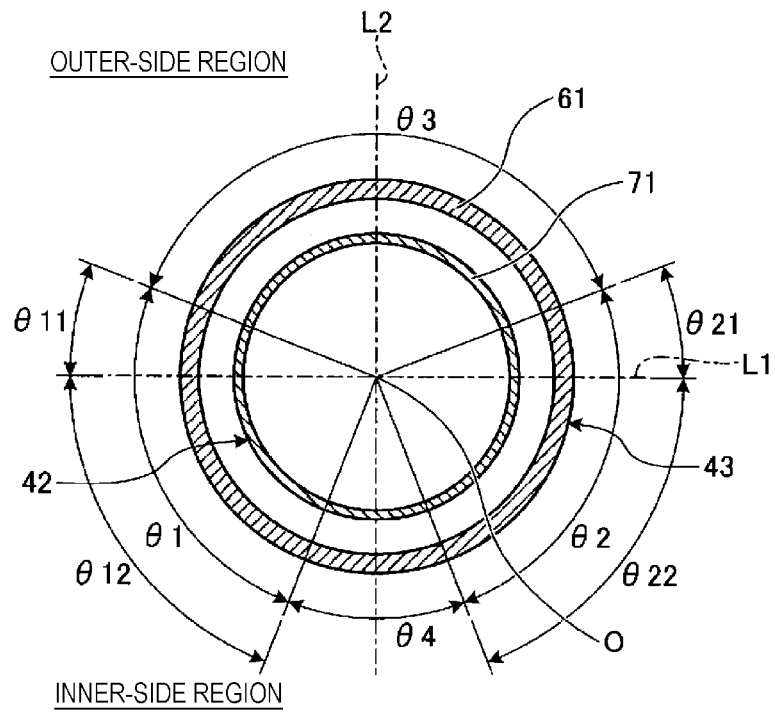
FIG. 14 is a cross-sectional view illustrating a connecting portion of a combustor basket and a combustor transition piece in a gas turbine combustor according to a fourth embodiment.

FIG. 14 is a cross-sectional view illustrating a connecting portion of a combustor basket and a combustor transition piece in a gas turbine combustor according to a fourth embodiment. Note that the same reference numerals are applied to members having the same functions as in the above-described embodiments, and detailed descriptions thereof will be omitted.

In the fourth embodiment, as illustrated in FIG. 14, an outer-side region of the cooling parts 81, 91 (refer to FIG. 2 and FIG. 4) in a region farther on an outer side in the radial direction of the gas turbine than a reference line L1, and an inner-side region of the cooling parts 81, 91 in a region farther on an inner side in the radial direction of the gas turbine than the reference line L1, with regard to the reference line L1 that is a straight line orthogonal to the radial direction and the axial direction of the gas turbine and passes through the axis center O of the combustor basket 42, are set. Furthermore, the connection angle α at the intersection (connection point D) between the extension line L of an outer surface of the combustor basket 42 along the axial direction and an inner surface of the combustor transition piece 43 is set. Furthermore, the first regions θ1, θ2 set at positions near the reference line L1 in either the outer-side region or the inner-side region, and the second regions θ3, θ4 with a larger connection angle α than in the first regions θ1, θ2, set at positions farther from the reference line L1 than the first regions θ1, θ2 are set. Furthermore, the second regions θ3, θ4 (second cooling part 91) are set such that the flow rate of compressed air (cooling medium) is higher than in the first regions θ1, θ2 (first cooling part 81). The configuration is essentially the same configuration as in the first embodiment.

Furthermore, the first regions θ1, θ2 set at positions near the reference line L1 in either the outer-side region or the inner-side region, and the second regions θ3, θ4 with the narrower radial gap S than the first regions θ1, θ2, set at positions farther from the reference line L1 than the first regions θ1, θ2 are set, and the second regions θ3, θ4 are set to have a higher flow rate of the compressed air (cooling medium) than the first regions θ1, θ2. The configuration is essentially the same configuration as in the second embodiment.

A relationship between the first regions θ1, θ2 and the second regions θ3, θ4 and a relationship between the first cooling part 81 and the second cooling part 91 are specifically described below.

A cross-sectional area of the cooling parts 81, 91 per unit length in the circumferential direction of the combustor basket 42 and the combustor transition piece 43 is set to be larger in the second regions θ3, θ4 than in the first regions θ1, θ2. In other words, the cross-sectional area per unit length in the first cooling part 81 in the circumferential direction is set to be larger than the cross-sectional area per unit length of the second cooling part 91 in the circumferential direction.

The outer-side region is set in outer-side first regions θ11, θ21 constituting a portion of the first regions θ1, θ2, and in an outer-side second region θ3 constituting the second region farther on an outer side in the radial direction of the gas turbine than the outer-side first regions θ11, θ21, and the outer-side second region θ3 is set to be larger than a total region of the outer-side first regions θ11, θ21.

The inner-side region is set in inner-side first regions θ12, θ22 constituting a portion of the first regions θ1, θ2, and an inner-side second region θ4 constituting the second region farther on an inner side in the radial direction of the gas turbine than the inner-side first regions θ12, θ22, and the inner-side second region θ4 is set to be smaller than a total region of the inner-side first regions θ12, θ22.

In this case, the outer-side second region θ3 is set to be larger than the inner-side second region θ4.

The first regions θ1, θ2 and the second regions θ3, θ4 are each set to be axisymmetric with regard to a second reference line L2 orthogonal to the reference line L1 and the axial direction of the combustor basket 42.

The number of the cooling passages in the outer-side region is set to be higher than the number of the cooling passages in the inner-side region. Furthermore, the number of the cooling passages in the first regions θ1, θ2 is set to be lower than the number of the cooling passages in the second regions θ3, θ4.

An average interval of the plurality of cooling passages is set within from 5.5 mm to 8.5 mm in the first regions θ1, θ2, and set within from 2.0 mm to 5.0 mm in the second regions θ3, θ4. In other words, the average interval of the cooling passages in the first cooling part 81 is set within from 5.5 mm to 8.5 mm, and the average interval of the cooling passages in the second cooling part 91 is set within from 2.0 mm to 5.0 mm.

The outer-side first regions θ11, θ21 and the outer-side second region θ3 are adjacent in the circumferential direction of the combustor basket 42, and a boundary position between each of the outer-side first regions θ11, θ21 and the outer-side second region θ3 is set within a range of 15 degrees to 30 degrees from the reference line L1.

The inner-side first regions θ12, θ22 and the inner-side second region θ4 are adjacent in the circumferential direction of the combustor basket 42, and a boundary position between each of the inner-side first regions θ12, θ22 and the inner-side second region θ4 is set within a range of 60 degrees to 75 degrees from the reference line L1.

The connection angle α at a position where the combustor basket 42 and the reference line L1 intersect is set at 0 degrees, the connection angle α at a position intersecting with the second reference line L2 in the outer-side regions is set within from 12 degrees to 16 degrees, and the connection angle α at a position intersecting with the second reference line L2 in the inner-side regions is set within from 8 degrees to 12 degrees.

The relationship between the first regions θ1, θ2 and the second regions θ3, θ4 and the relationship between the first cooling part 81 and the second cooling part 91 are preferably set within the aforementioned ranges, and thus the combustor basket 42 can be efficiently cooled by this configuration.

Note that in the above-described first embodiment, the cooling parts 81, 91 are provided as the passages 82, 92, 93 penetrating the plate thickness of the combustor basket 42 along the flow direction of the combustion gas G, and the cooling parts 101, 111 are provided as the passages 102, 112, 113 formed in the combustor transition piece 43, but the cooling parts are not restricted to these configurations. For example, the passages may be inclined with regard to the flow direction of the combustion gas G, or may extend along the circumferential direction of the combustor basket 42.

REFERENCE SIGNS LIST

10 Gas turbine
11 Compressor
12 Combustor
13 Turbine
41 Combustor external cylinder
42 Combustor basket (combustion cylinder)
43 Combustor transition piece
61 Cylindrical portion
64a, 64b First side
65a, 65b Second side
66 Spring clip
67 Buggy clip
71 End portion
81 First cooling part
82 First cooling passage
83 First cooling hole
91 Second cooling part
92 First passage (second cooling passage)
93 Second passage (second cooling passage)
94 Merging portion (second cooling passage)
95 Second cooling hole
101, 111 Cooling part
102, 112, 113 Cooling passage
D Connection point (intersection)
L Extension line
L1 Reference line
L2 Second reference line
S, S1, S2 Radial gap
α, α1, α2 Connection angle
θ1, θ2 First region
θ3 Outer-side second region (second region)
θ4 Inner-side second region (second region)
θ11, θ21 Outer-side first region
θ12, θ22 Inner-side first region

The invention claimed is:

1. A combustion cylinder of a gas turbine in which compressed air and fuel are to be mixed and combusted, an end portion of the combustion cylinder on a downstream side in a flow direction of combustion gas being inserted and connected to a transition piece with a radial gap between the combustion cylinder and the transition piece, the radial gap extending along a circumferential direction, and the combustion cylinder being configured to be cooled by a cooling medium in a cooling part at a connecting portion with the transition piece, wherein:

an outer-side region of the cooling part is set, the outer-side region being farther on an outer side in a radial direction of the gas turbine than a reference line which is a straight line that passes through a center of the combustion cylinder and is orthogonal to: (i) an axial direction of the gas turbine; and (ii) the radial direction of the gas turbine;

an inner-side region of the cooling part is set, the inner-side region being farther on an inner side in the radial direction of the gas turbine than the reference line;

a connection angle at an intersection between an extension line of an outer surface of the combustion cylinder along the axial direction of the gas turbine and an inner surface of the transition piece is set;

a first region is set at a position near the reference line in either the outer-side region or the inner-side region, and a second region, with a larger connection angle than the first region, is set at a position farther from the reference line than the first region; and the second region is set to have a higher flow rate of the cooling medium than the first region.

2. The combustion cylinder according to claim 1, wherein the connecting portion comprises the end portion of the combustion cylinder in the axial direction of the gas turbine and an end portion of the transition piece in the axial direction of the gas turbine overlapping in the radial direction of the gas turbine, and the cooling part is in the end portion of the combustion cylinder in the axial direction of the gas turbine or the end portion of the transition piece in the axial direction of the gas turbine.

3. The combustion cylinder according to claim 2, wherein the cooling part has a plurality of cooling passages defined in the end portion of the combustion cylinder on the downstream side in the flow direction of combustion gas at intervals in the circumferential direction so as to extend along the flow direction of the combustion gas, and an average interval of the plurality of cooling passages in the second region is set to be smaller than an average interval of the plurality of cooling passages in the first region.

4. The combustion cylinder according to claim 3, wherein the plurality of cooling passages have first end portions that open to the radial gap, and second end portions that open in an end surface of the combustion cylinder on the downstream side in the flow direction of the combustion gas.

5. The combustion cylinder according to claim 4, wherein the plurality of cooling passages in the second region include first passages of which first end portions open to the radial gap, second passages of which first end portions open in the end surface of the combustion cylinder, and a merging portion where second end portions of the first passages and second end portions of the second passages connect, and wherein the second passages are provided in a higher number than the first passages.

6. The combustion cylinder according to claim 3, wherein the average interval of the plurality of cooling passages in the first region is set within from 5.5 mm to 8.5 mm, and the average interval of the plurality of cooling passages in the second region is set within from 2.0 mm to 5.0 mm.

7. The combustion cylinder according to claim 2, wherein the cooling part has a plurality of cooling passages defined in the end portion of the combustion cylinder on the downstream side in the flow direction of the combustion gas at intervals in the circumferential direction so as to extend along the flow direction of the combustion gas, and a cross-sectional area of the cooling passages per unit length in the circumferential direction is set to be larger in the second region than in the first region.

8. The combustion cylinder according to claim 2, wherein the cooling part has a plurality of cooling passages defined in the end portion of the combustion cylinder on the downstream side in the flow direction of the combustion gas at intervals in the circumferential direction so as to extend along the flow direction of the combustion gas, and a number of the cooling passages in the outer-side region is set to be higher than a number of the cooling passages in the inner-side region.

9. The combustion cylinder according to claim 2, wherein the cooling part has a plurality of cooling passages defined in the end portion of the combustion cylinder on the downstream side in the flow direction of combustion gas at intervals in the circumferential direction so as to extend along the flow direction of the combustion gas, and a number of the cooling passages in the first region is set to be lower than a number of the cooling passages in the second region.

10. The combustion cylinder according to claim 1, wherein the transition piece has a cylindrical shape on an upstream side in the flow direction of the combustion gas, and has a rectangular cylindrical shape on the downstream side in the flow direction of the combustion gas, the rectangular cylindrical shape having a length of a second side along the circumferential direction longer than a length of a first side along the radial direction of the gas turbine, and the first region is on the first side and the second region is on the second side.

11. The combustion cylinder according to claim 1, wherein the outer-side region is set in an outer-side first region constituting the first region, and in an outer-side second region constituting the second region farther on the outer side in the radial direction of the gas turbine than the outer-side first region, and the outer-side second region is set to be larger than the outer-side first region.

12. The combustion cylinder according to claim 11, wherein the outer-side first region and the outer-side second region are adjacent in the circumferential direction, and a boundary position between the outer-side first region and the outer-side second region is set within a range of 15 degrees to 30 degrees from the reference line.

13. The combustion cylinder according to claim 1, wherein the inner-side region is set in an inner-side first region constituting the first region, and in an inner-side second region constituting the second region farther on the inner side in the radial direction of the gas turbine than the inner-side first region, and the inner-side second region is set to be smaller than the inner-side first region.

14. The combustion cylinder according to claim 13, wherein the inner-side first region and the inner-side second region are adjacent in the circumferential direction, and a boundary position between the inner-side first region and the inner-side second region is set within a range of 60 degrees to 75 degrees from the reference line.

15. The combustion cylinder according to claim 1, wherein:
the outer-side region is set in an outer-side first region constituting the first region, and in an outer-side second region constituting the second region farther on the outer side in the radial direction of the gas turbine than the outer-side first region, and the outer-side second region is set to be larger than the outer-side first region; and
the inner-side region is set in an inner-side first region constituting the first region, and in an inner-side second region constituting the second region farther on the inner side in the radial direction of the gas turbine than the inner-side first region, and the outer-side second region is set to be larger than the inner-side second region.

16. The combustion cylinder according to claim 1, wherein the reference line is a first reference line, and the first region and the second region are each set to be axisymmetric with regard to a second reference line orthogonal to the first reference line and an axial direction of the combustion cylinder.

17. The combustion cylinder according to claim 16, wherein the connection angle at a position where the combustion cylinder and the first reference line intersect is set at 0 degrees, the connection angle at a position intersecting with the second reference line in the outer-side region is set within from 12 degrees to 16 degrees, and the connection angle at a position intersecting with the second reference line in the inner-side region is set within from 8 degrees to 12 degrees.

18. A gas turbine combustor, comprising:
   the combustion cylinder according to claim 1; and
   the transition piece.

19. A gas turbine, comprising:
   a compressor configured to compress air;
   the gas turbine combustor according to claim 18; and
   a turbine configured to produce rotational power by combustion gas generated by the gas turbine combustor.

20. A combustion cylinder of a gas turbine in which compressed air and fuel are to be mixed and combusted, an end portion of the combustion cylinder on a downstream side in a flow direction of combustion gas being inserted and connected to a transition piece with a radial gap between the combustion cylinder and the transition piece, the radial gap extending along a circumferential direction, and the combustion cylinder being configured to be cooled by a cooling medium in a cooling part at a connecting portion with the transition piece, wherein:
   an outer-side region of the cooling part is set, the outer-side region being farther on an outer side in a radial direction of the gas turbine than a first reference line which is a straight line that passes through a center of the combustion cylinder and is orthogonal to: (i) an axial direction of the gas turbine; and (ii) the radial direction of the gas turbine;
   an inner-side region of the cooling part is set, the inner-side region being farther on an inner side in the radial direction of the gas turbine than the first reference line;
   a first region is set at a position near the first reference line in either the outer-side region or the inner-side region, and a second region is set at a position farther from the first reference line than the first region;
   the second region is set to have a higher flow rate of the cooling medium than the first region;
   the first region includes a region across which the first reference line passes;
   the second region includes a region across which a second reference line orthogonal to the first reference line and an axial direction of the combustion cylinder passes; and
   the radial gap, on the second reference line, at an axial position of the combustion cylinder in the second region is narrower than the radial gap, on the first reference line, at the axial position of the combustion cylinder in the first region.

* * * * *